UNITED STATES PATENT OFFICE.

GEORGE HECKER, OF BOROSOLVAY, CALIFORNIA, ASSIGNOR TO PACIFIC COAST BORAX COMPANY, OF NEW YORK, N. Y., A CORPORATION OF NEVADA.

RECOVERY OF POTASH FROM POTASH-BEARING BRINES.

1,378,410.     Specification of Letters Patent.     Patented May 17, 1921.

No Drawing.     Application filed September 21, 1918. Serial No. 255,044.

*To all whom it may concern:*

Be it known that I, GEORGE HECKER, a subject of the Emperor of Germany, residing at Borosolvay, in the county of San Bernardino, State of California, have invented certain new and useful Improvements in the Recovery of Potash from Potash-Bearing Brines; and I do hereby declare the following to be a full, clear, and exact description of the invention, such as will enable others skilled in the art to which it appertains to make and use the same.

The present invention relates to the recovery from potash-bearing brines and liquors, of potash, in the form of crystals of good white color and of a uniform coarse granulation, the material in this condition being capable of ready handling for sampling and shipment. The practice of the invention involves, moreover, a very considerable reduction in the cost of labor, as compared with usual methods for recovering potash from potash-bearing liquors, and permits the potash to be recovered from the liquor containing it in a radically shorter period of time than has been heretofore found feasible.

In the practice of the invention, alkaline potash-bearing brines are preliminarily concentrated, either entirely by artificial or natural evaporation, or by solar evaporation followed by artificial evaporation, the artificial evaporation being most economically accomplished in multiple-effect vacuum pans.

The composition of a typical raw potash brine, adapted for the practice of the invention, varies largely according to its place of origin, but in my case a liter of an average sample contained substantially the following quantities of the soluble ingredients specified, to-wit:

61 grams potassium chlorid ($KCl$).
20 grams borax ($Na_2B_4O_7$).
61 grams sodium carbonate ($Na_2CO_3$).
82 grams sodium sulfate ($Na_2SO_4$).
208 grams sodium chlorid ($NaCl$).

The brine is evaporated to a point where the amount of potassium chlorid ($KCl$) has reached at least the figure 180–200 grams per liter, and it would even be preferable to carry the concentration to such a point that the amount of potassium chlorid present would be from 220 to 250 grams per liter. During the evaporation, large quantities of the salts present are precipitated and are discarded as waste salts; in this way, about 90% of the sodium sulfate, 50% of the sodium carbonate, and 80% of the sodium chlorid are removed.

The evaporation of the brine to obtain the concentration referred to takes place, to the best advantage, as hereinbefore noted, in multiple-effect vacuum pans. At the termination of the concentrating stage of the process, I have found that if the cooling of the liquors is effected under certain conditions, the potassium salts can be largely precipitated therefrom in less than 24 hours, leaving almost all of the borax still in solution.

To this end, the hot liquor is withdrawn into a special tank and is agitated in said tank, while subjected to the cooling action of a coiled pipe through which a cooling medium is constantly passing, the combined agitation and cooling resulting in a precipitation of potassium salts of good white color, and of fairly uniform, soft and coarse granulation.

A suitable tank for this purpose will consist of a cylindrical main body portion 8 to 12 ft. in diameter and 8 to 12 ft. high, provided with a conical bottom, the height of the cone being 6 to 8 ft. The main body portion of the tank will be provided with a valved outlet a few inches above the cone, another outlet is located between top of cone and bottom of same and a closable outlet will also be provided at the bottom of the cone. A stirring device for agitating the hot liquor in the tank may consist of a vertical shaft suitably supported and provided with agitating paddles mounted thereon. The shaft may be driven in any suitable manner and at a speed of rotation averaging about twenty revolutions per minute. The shaft may be driven in any suitable manner. Agitating may also be effected by means of compressed air or by a propeller device. Within the tank will be located one or more cooling coils of metal, through which cooling water or other suitable cooling medium is to be passed for the purpose of progressively lowering the temperature of the hot liquor. For convenience, it will be found desirable, in most cases, to employ two such coils, each having separate cooling medium connections.

I have found that by starting with a solution concentrated in a multiple-effect vacuum pan to the extent hereinbefore indicated, and having a temperature of about 95° C. when it enters the agitating and cooling tank, it is readily possible by the combined effect of the cooling coils and the agitator, not only to recover the desired output of potassium salts within a period of time not exceeding 24 hours, but also to recover said potassium salts in the form of practically uniform coarse crystals of good white color, leaving nearly all of the borax in the solution so as to substantially prevent precipitation thereof, and coresponding contamination of the potassium salts. I thereupon promptly separate the recovered potassium salts from the solution, in any suitable manner.

The results obtained by the practice of the invention are of very material importance in the art, which, as heretofore commercially practised, has involved gradual cooling in iron tanks over a period of many days (on the average, a week) according to the quality of the liquor and the season of the year. These tanks have usually had a capacity as high as say 15 cubic meters, and, after the liquor has been drawn off, the crystals are found to be hard and of irregular size, exhibiting considerable discoloration. Their removal, moreover, has involved a considerable expenditure of hand labor, inasmuch as they become hard on the sides, and more or less mushy on the bottom of the tanks, so that their removal requires the aid of the pick and shovel. The potassium salts obtained by the practice of the present invention, on the other hand, are not only of good white color, but of fairly uniform, soft, and coarse granulation, and can be discharged from the conical bottom of the tank with the minimum of manual assistance. A suitable and convenient method of separating the crystals from the residual liquor containing the borax and other salts in solution is to permit the main body portion of the supernatent liquor to be drawn off quickly through the valved outlet in the main body portion of the tank; then to discharge through the bottom opening of the cone the potassium salts together with the remainder of the liquor into a receiving vessel; and to then separate from the withdrawn potassium salts the liquor accompanying them, which may be effected by filtration or centrifugalizing, or in any other suitable way. Both bodies of liquid may then be brought together for concentration and further precipitation of potassium salt and other values. The potassium salts can be washed, dried, and otherwise handled as in ordinary factory practice.

The main characteristic feature of the invention, to which the approved results obtained are due are the quick cooling and agitation incident to its practice,—features, which, in so far as I am aware have not before been employed in the art of recovering potash from potash-bearing brines.

It will, of course, be understood, that the potassium salt product, while of greater purity than the product obtained by the former practice hereinbefore referred to, is not absolutely free from borax, although, from the first concentrated liquor a potassium salt product can be obtained containing only a few tenths of one per cent. of borax. It will also be understood that, because of the very soluble character of many of the potassium salts, a large amount of the potassium salts will remain in the liquor (according to the temperature of the latter) after the liquor has been drawn off from the precipitating tank.

Having thus described my invention, what I claim is:

1. The method of recovering potassium salts from brines containing them in solution in association with salts of sodium and borax, which consists in first concentrating and evaporating the brine to remove the major portion of the sodium salts by precipitation, and then simultaneously agitating and rapidly cooling by circulation of a cooling medium in indirect contact therewith the body of hot liquor left after the precipitation of said salts until the potassium salts are precipitated as uniform coarse crystals of good white color before any substantial precipitation of the borax occurs, and thereupon separating from the liquor the potassium salts thus obtained; substantially as described.

2. The method of recovering potassium salt from brines containing them in solution in association with borax and salts of other elements, which consists of first concentrating and evaporating the brine to remove the major portion of the salts of other elements by precipitation, and then simultaneously agitating and rapidly cooling by circulation of a cooling medium in indirect contact therewith the body of hot liquor left after the precipitation of said salts until the potassium salts are precipitated as uniform coarse crystals of good white color before any substantial precipitation of borax occurs, and thereupon separating from the liquor the potassium salts thus obtained; substantially as described.

3. The method of recovering potassium salts from concentrated hot liquors containing them in solution, in association with borax, which consists in simultaneously agitating and rapidly cooling by circulation of a cooling medium in indirect contact therewith the body of hot liquors until the potassium salts are precipitated as uniform coarse crystals of good white color while the borax remains in solution, and thereupon separating from the liquor the potassium salts thus obtained; substantially as described.

In testimony whereof I affix my signature.

GEORGE HECKER.